(12) United States Patent
Poteet et al.

(10) Patent No.: US 11,433,424 B2
(45) Date of Patent: Sep. 6, 2022

(54) MULTILAYER HYDROPHILIC COATING AND METHODS OF MAKING THE SAME

(71) Applicant: Hamilton Sundstrand Corporation, Charlotte, NC (US)

(72) Inventors: Steven Poteet, Hamden, CT (US); Barbara M. Peyton, Windsor, CT (US); Iwona Wrobel, Manchester, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 139 days.

(21) Appl. No.: 16/583,675

(22) Filed: Sep. 26, 2019

(65) Prior Publication Data
US 2021/0094069 A1 Apr. 1, 2021

(51) Int. Cl.
| | | |
|---|---|---|
| *B05D 7/00* | (2006.01) | |
| *B32B 5/00* | (2006.01) | |
| *B05D 1/18* | (2006.01) | |
| *B05D 3/04* | (2006.01) | |
| *F28F 19/02* | (2006.01) | |
| *C23C 18/12* | (2006.01) | |
| *C23C 18/54* | (2006.01) | |

(52) U.S. Cl.
CPC ............ *B05D 7/5323* (2013.01); *B05D 1/18* (2013.01); *B05D 3/0413* (2013.01); *B05D 7/546* (2013.01); *B32B 5/00* (2013.01); *C23C 18/127* (2013.01); *C23C 18/54* (2013.01); *F28F 19/02* (2013.01); *B05D 2451/00* (2013.01); *B05D 2601/22* (2013.01); *C03C 2217/478* (2013.01); *C03C 2217/75* (2013.01); *F28F 2245/02* (2013.01)

(58) Field of Classification Search
None
See application file for complete search history.

(56) References Cited

U.S. PATENT DOCUMENTS

| 9,102,836 B2 | 8/2015 | Lin et al. |
| 2014/0004334 A1 | 1/2014 | Kalyankar |
| 2016/0287743 A1* | 10/2016 | Andrews ............... A61L 15/24 |
| 2017/0056834 A1* | 3/2017 | Bhushan ............... C09D 139/04 |

FOREIGN PATENT DOCUMENTS

| JP | 2018035031 A | 3/2018 |
| WO | 2015133606 A1 | 9/2015 |
| WO | 2016064494 A2 | 4/2016 |

OTHER PUBLICATIONS

Extended European Search Report issued in Application No. 20184722.5 dated Dec. 3, 2020, 7 pages.

(Continued)

*Primary Examiner* — Shamim Ahmed
*Assistant Examiner* — Bradford M Gates
(74) *Attorney, Agent, or Firm* — Cantor Colburn LLP

(57) ABSTRACT

Disclosed is a multilayer hydrophilic coating, comprising: a base layer comprising oxide particles, wherein a shape of an oxide particle is a hollow, generally spherical shell; a topcoat layer deposited on the base layer, wherein the topcoat layer comprises a sol-gel; and a doping agent, wherein the doping agent is located within the topcoat layer, deposited on the topcoat layer, located between the base layer and the topcoat layer, or combinations thereof.

17 Claims, 3 Drawing Sheets

(56) References Cited

OTHER PUBLICATIONS

Reza Aghaei et al., "Durable transparent super-hydrophilic hollow SiO2-SiO2 nanocomposite thin film" Materials Chemistry and Physics, Elsevier, vol. 219, 2018, 14 pages.
S Ganjoo et al., "Persistent superhydrophilicity of sol-gel derived nanoporous silica thin films" Journal of Physics D: Applied Physics, vol. 42, 2009, 7 pages.

* cited by examiner

MULTILAYER HYDROPHILIC COATING AND METHODS OF MAKING THE SAME

STATEMENT OF FEDERAL SUPPORT

This invention was made with Government support under contract 80JFC018P0039 awarded by the National Aeronautics and Space Administration. The Government has certain rights in the invention.

BACKGROUND

Exemplary embodiments pertain to the art of hydrophilic coatings, more particularly, to multilayer hydrophilic coatings for spacecraft components.

Aircraft and/or spacecraft components, for example, heat exchangers aboard the International Space Station, use hydrophilic coatings in order to facilitate the collection of condensed humidity. Common coatings include, for example, zinc silicate with silver oxide as an antimicrobial agent. However, these coatings suffer from problems such as flacking, dissolution of the coating, and DMSD catalysis. Antifungal properties are also lacking. For example, fungal build up can necessitate frequent and undesired maintenance of the aircraft components.

Therefore, there is a need to develop a hydrophilic coating that avoids problems such as flacking, dissolution, DMSD catalysis, and fungal build up.

BRIEF DESCRIPTION

Disclosed is a multilayer hydrophilic coating, comprising: a base layer comprising oxide particles, wherein a shape of an oxide particle is a hollow, generally spherical shell; a topcoat layer deposited on the base layer, wherein the topcoat layer comprises a sol-gel; and a doping agent, wherein the doping agent is located within the topcoat layer, deposited on the topcoat layer, located between the base layer and the topcoat layer, or combinations thereof.

Also disclosed is a substrate coated with the multilayer hydrophilic coating.

Also disclosed is a method of making the multilayer hydrophilic coating, the method comprising: dip coating a substrate with a solution comprising the oxide particles to form the base layer; and dip coating and calcining the substrate with a solution comprising a sol-gel precursor to form the sol-gel and the topcoat layer; wherein the doping agent is included in the topcoat solution, the base layer solution, or combinations thereof; or the method further comprises dip coating and calcining the substrate with a solution comprising the doping agent.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed coating and method are presented herein by way of exemplification and not limitation with reference to the Figures.

Figure 1:
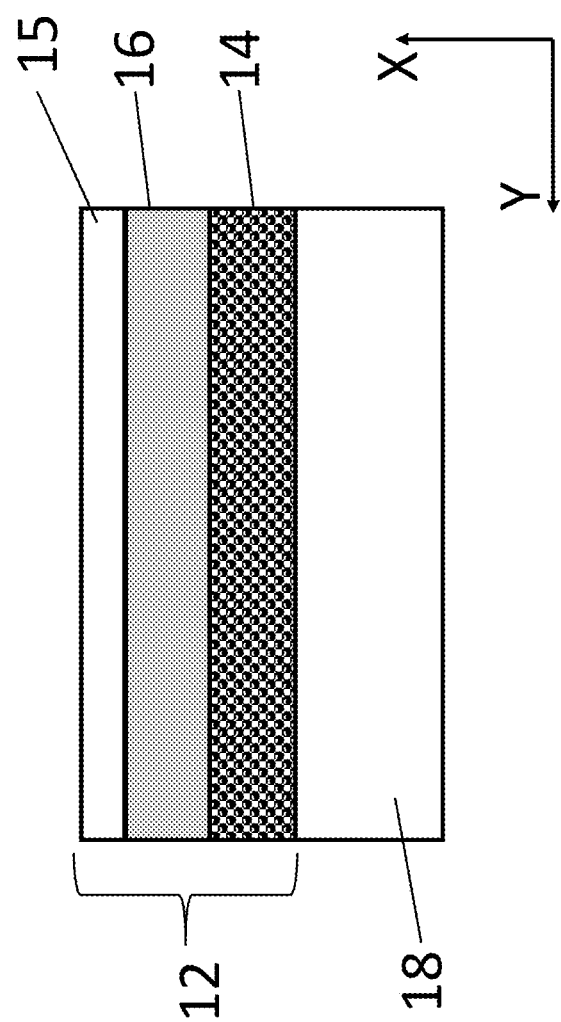
FIG. 1 is a cross-section of a multilayer hydrophilic coating according to an exemplary embodiment.

Referring to FIG. 1, a multilayer hydrophilic coating 12 can comprise a base layer 14. A thickness of the base layer 14 (in the X direction) can be about 200 nanometers to about 1000 nanometers, for example, about 400 nanometers to about 800 nanometers, for example, about 500 nanometers to about 700 nanometers, or for example, about 600 nanometers.

Figure 2:
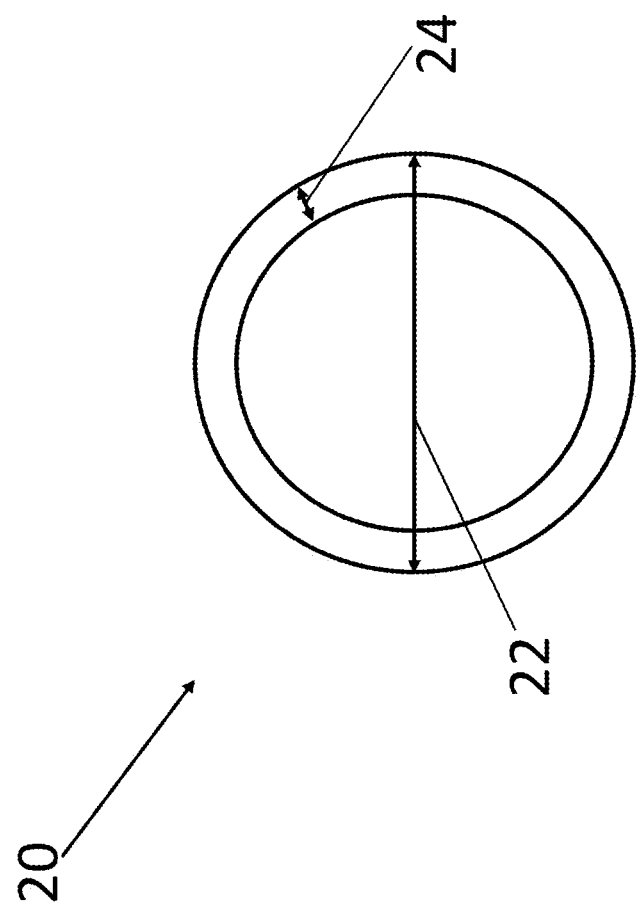
FIG. 2 is a cross-section of an oxide particle according to an exemplary embodiment.

The base layer 14 can comprise oxide particles 20 as shown in FIG. 2. For example, oxide particles 20 can be oxides of silicon, zirconium, aluminum, titanium, boron, phosphorus, vanadium, strontium, magnesium, calcium, zinc, chromium, iron, cobalt, copper, nickel, manganese, niobium, tantalum, yttrium, lanthanum, hafnium, gallium, indium, silver, or any combination(s) thereof. For example, base layer 14 can comprise silicon dioxide particles. A shape of an oxide particle 20 can be a hollow shell that is generally spherical. Generally spherical can refer to a spherical shape or a spheroid shape (i.e., a sphere-like but not perfectly spherical body). A diameter 22 of an oxide particle 20 can be about 50 nanometers to about 100 nanometers, for example, about 65 nanometers to about 85 nanometers, for example, about 70 nanometers to about 80 nanometers, for example, about 75 nanometers. A thickness 24 of an oxide particle 20 can be about 10 nanometers to about 20 nanometers, for example, about 14 nanometers to about 16 nanometers, for example, about 15 nanometers.

The multilayer hydrophilic coating 12 can comprise a topcoat layer 16 deposited on the base layer 14. A thickness of the topcoat layer 16 (in the X direction) can be about 200 nanometers to about 1000 nanometers, for example, about 400 nanometers to about 800 nanometers, for example, about 500 nanometers to about 700 nanometers, or for example, about 600 nanometers. In an embodiment, the thickness of the base layer 14 can be equal to the thickness of the topcoat layer 16.

The topcoat layer 16 can comprise sol-gel. "Sol-gel" can refer to a solid material made via transformation of monomers into a colloidal solution (the "sol") that acts as the forerunner for an integrated network (the "gel") of discrete particles or network polymers.

The sol-gel of the topcoat layer 16 can comprise an oxide of silicon, zirconium, aluminum, titanium, boron, phosphorus, vanadium, strontium, magnesium, calcium, zinc, chromium, iron, cobalt, copper, nickel, manganese, niobium, tantalum, yttrium, lanthanum, hafnium, gallium, indium, or combinations thereof. For example, the sol-gel of the topcoat layer 16 can comprise silicon dioxide.

The topcoat layer 16 can immobilize the oxide particles 20 of the base layer 14 and allow the coating 12 to achieve hydrophilic properties. For example, the hydrophilic coating 12 can exhibit high degrees of wetting and/or a low liquid contact angle. Contact angle can refer to an angle measured where a liquid meets a surface of the hydrophilic coating 12. For example, a contact angle of the hydrophilic coating 12 can be about 2 degrees to about 20 degrees, for example, about 5 degrees to about 15 degrees, for example, about 10 degrees to about 12 degrees, or for example, about 11 degrees.

The multilayer hydrophilic coating 12 can further comprise a doping agent. For example, the doping agent can be located within the topcoat layer 16. Additionally or alternatively, the doping agent can be deposited into the hydrophilic coating 12 as its own distinct layer 15, as shown in FIG. 1. For example, the doping agent can be a deposited on the topcoat layer 16, located between the base layer 14 and the topcoat layer 16, or any combinations thereof.

In an embodiment, the base layer 14, like the topcoat layer 16 described herein, can also comprise a sol-gel. A doping agent can be located within the sol-gel of the base layer 14.

The doping agent can be an antimicrobial agent, an antifungal agent, or combinations thereof. The doping agent can comprise inorganic constituents. For example, the doping agent can comprise silver nitrate, silver oxide, copper sulfate, zinc sulfate, potassium silicate, potassium bicarbonate, or combinations thereof. The doping agent can comprise organic constituents. For example, the doping agent can comprise benzimidazoles, thiophanates, dicarboximides, imidazoles, piperazines, triazoles, triazolinthiones, acylalanine, piperidines, pyrazole-4-carboxamides, pyridine-carboxamides, pyridinyl-ethyl-benzamides, anilinopyrimidines, methoxy acrylates, dihydro dioxazines, imidazolinones, methoxycarbarmates, oximino acetates, phenylpyrroles, aryloxyquinolines, 1,2,4-triadiazoles, hydroxyanilides, cyano-imidazoles, toluamides, cyanoacetamides oximes, carbamates, 2,6-dinitroanilines, tri-phenyl tin compounds, ethyl phospho6nates, cinnamic acid amides, tetracyclines, pyridinylmethyl-benzamides, triazolo-pyrimidylamines, benzothiadiazoles, phenyl-acetamides, benzophenones, piperidinyl thiazole isoxazolines, dithiocarbamates, phthalimides, chloronitriles, cinnamaldehyde, citric acid, or combinations thereof. A weight percent of the doping agent can be about 1% to about 50%, for example, about 5% to about 45%, for example, about 10% to about 40%, for example, about 20% to about 30%, for example, about 25%, based on a total weight of the coating.

A substrate 18 can be coated with the multilayer hydrophilic coating 12, as shown in FIG. 1. In an embodiment, the substrate 18 can be a component of an aircraft and/or spacecraft. For example, the substrate 18 can be a wing, a heat exchanger, a propeller blade, a propeller shank, a propeller hub, a propeller barrel, a propeller tulip, a landing gear component, an engine gear, an engine disc, a shaft, a strut, a counterweight, or combinations thereof. For example, in an embodiment, the substrate 18 can be a surface of a heat exchanger aboard a spacecraft.

Figure 3:
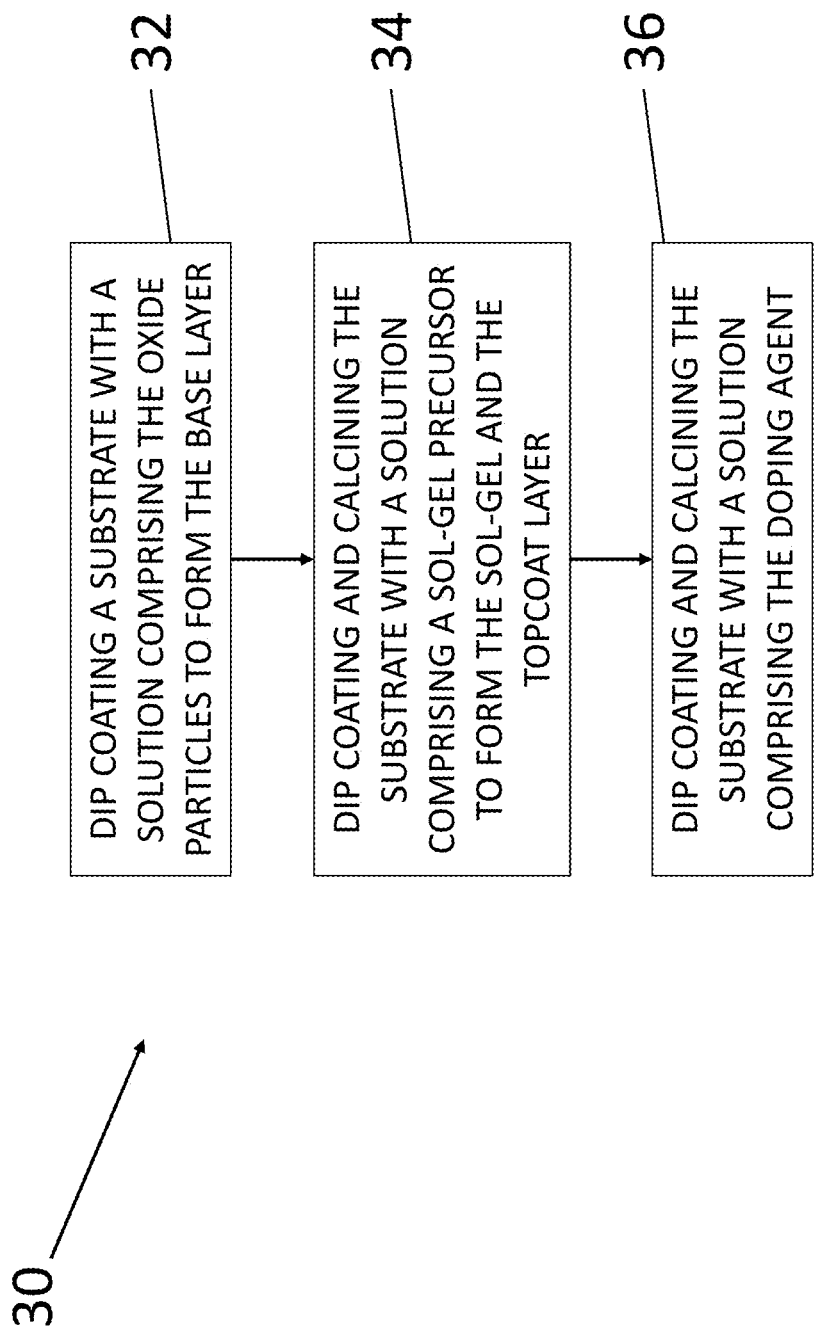
FIG. 3 is a flow diagram representing a method of making a multilayer hydrophilic coating according to an exemplary embodiment.

Now referring to FIG. 3, a method of making the multilayer hydrophilic coating 12 can comprise step 32: dip coating a substrate 18 with a solution comprising the oxide particles 20 to form the base layer 14. The method can further comprise step 34: dip coating and calcining the substrate 18 with a solution comprising a sol-gel precursor to form the sol-gel and the topcoat layer 34. A sol-gel "precursor" can refer to a solution that will solidify into the sol-gel. The doping agent can be included in the topcoat solution, the base layer solution, or combinations thereof or the method can further comprise step 36: dip coating and calcining the substrate 18 with a solution comprising the doping agent.

In an embodiment, the solution comprising the doping agent can be about 1% doping agent to about 20% doping agent by weight, based on a total weight of the doping agent solution, for example, about 5% doping agent to about 15% doping agent, for example, about 10% doping agent by weight.

In an embodiment, the doping agent can be included in the topcoat solution. Additionally or alternatively, the doping agent can be deposited into the hydrophilic coating 12 as its own distinct layer 15, as shown in FIG. 1. For example, the doping agent can be dip coated and calcined onto the topcoat layer 16, located between the base layer 14 and the topcoat layer 16, or combinations thereof.

A calcining temperature can be about 300° C. to about 500° C. (about 572° F. to about 932° F.), for example, about 350° C. to about 450° C. (about 662° F. to about 842° F.), for example, about 400° C. (about 752° F.). A calcining time can be about 0.5 hours to about 1.5 hours, for example, about 1 hour. A submersion time of the substrate 18 in solution can be about 15 minutes to about 45 minutes, for example, about 20 minutes to about 40 minutes, for example, about 25 minutes to about 35 minutes, for example, about 30 minutes.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A multilayer hydrophilic coating, comprising:
   a substrate, wherein the substrate is a surface of a heat exchanger of a spacecraft;
   a base layer coated on the substrate and comprising oxide particles, wherein a shape of an oxide particle is a hollow, generally spherical shell;
   a topcoat layer deposited on the base layer, wherein the topcoat layer comprises a sol-gel; and
   a doping agent, wherein the doping agent is located within the topcoat layer, deposited on the topcoat layer, located between the base layer and the topcoat layer, or combinations thereof.

2. The multilayer hydrophilic coating of claim 1, wherein a thickness of the base layer is about 400 nanometers to about 1000 nanometers.

3. The multilayer hydrophilic coating of claim 1, wherein a thickness of the topcoat layer is about 400 nanometers to about 1000 nanometers.

4. The multilayer hydrophilic coating of claim 1, wherein a diameter of the oxide particle is about 65 nanometers to about 100 nanometers.

5. The multilayer hydrophilic coating of claim 1, wherein a thickness of the oxide particle is about 10 nanometers to about 20 nanometers.

6. The multilayer hydrophilic coating of claim 1, wherein the base layer further comprises a sol-gel, wherein a doping agent is located within the sol-gel of the base layer.

7. The multilayer hydrophilic coating of claim 6, wherein the sol-gel of the topcoat layer comprises silicon dioxide.

8. The multilayer hydrophilic coating of claim 1, wherein the oxide particles are silicon dioxide particles.

9. The multilayer hydrophilic coating of claim 1, wherein the doping agent is an antimicrobial agent, an antifungal agent, or combinations thereof; and wherein the doping agent comprises silver nitrate, silver oxide, copper sulfate, zinc sulfate, potassium silicate, potassium bicarbonate, or combinations thereof.

10. The multilayer hydrophilic coating of claim 1, wherein a weight percent of the doping agent is about 1% to about 50% based on a total weight of the coating.

11. The multilayer hydrophilic coating of claim 1, wherein a contact angle of the coating is about 2 degrees to about 20 degrees.

12. A method of making the multilayer hydrophilic coating of claim 1, the method comprising:
  dip coating the substrate with a solution comprising the oxide particles to form the base layer; and
  dip coating and calcining the substrate with a solution comprising a sol-gel precursor to form the sol-gel and the topcoat layer;
  wherein the doping agent is
    included in the topcoat solution, the base layer solution, or combinations thereof; or
    the method further comprises dip coating and calcining the substrate with a solution comprising the doping agent.

13. The method of claim 12, wherein a calcining temperature is about 300° C. to about 500° C. (about 572° F. to about 932° F.).

14. The method of claim 12, wherein a calcining time is about 0.5 hours to about 1.5 hours.

15. The method of claim 12, wherein a submersion time of the substrate in solution is about 15 minutes to about 45 minutes.

16. The method of claim 12, wherein the doping agent is included in the topcoat solution.

17. The method of claim 12, wherein the doping agent solution comprises about 1% doping agent to about 20% doping agent by weight, based on a total weight of the doping agent solution.

* * * * *